United States Patent [19]

Karg

[11] Patent Number: 5,719,223
[45] Date of Patent: Feb. 17, 1998

[54] ALLOYS OF NITRILE RUBBERS AND POLYAMIDES

[76] Inventor: Rudolph Karg, 3039 Woodland Ridge Blvd., Baton Rouge, La. 70816

[21] Appl. No.: 708,320

[22] Filed: Sep. 5, 1996

Related U.S. Application Data

[63] Continuation of Ser. No. 182,847, Jan. 14, 1994, abandoned, which is a continuation of Ser. No. 844,743, Mar. 2, 1992, abandoned.

[51] Int. Cl.$^6$ ........................................... C08K 3/34
[52] U.S. Cl. .................. 524/445; 524/425; 524/449; 524/451; 525/179; 525/183
[58] Field of Search .................. 524/425, 445, 524/449, 451; 525/179, 183

[56] References Cited

U.S. PATENT DOCUMENTS

| | | | |
|---|---|---|---|
| 3,218,371 | 11/1965 | Grabowski | 525/179 |
| 4,356,286 | 10/1982 | Bethea et al. | 525/183 |
| 4,508,867 | 4/1985 | Sato | 524/434 |
| 4,619,962 | 10/1986 | Sato | 524/401 |

*Primary Examiner*—Vasu Jagannathan
*Assistant Examiner*—John J. Guarriello
*Attorney, Agent, or Firm*—Dressler, Rockey, Milnamow & Katz, Ltd.

[57] ABSTRACT

An alloy of a polyamide thermoplastic polymer and a nitrile thermoelastic polymer and method for its preparation in which the polyamide and the nitrile are blended at an elevated temperature in the presence of an antioxidant and then cooled. The resulting blend is an alloy in that each polymer phase is miscible with and dissolved in the other.

32 Claims, No Drawings

ALLOYS OF NITRILE RUBBERS AND POLYAMIDES

This is a continuation of U.S. Ser. No. 08/182,847 filed Jan. 14, 1994 which is a continuation of U.S. Ser. No. 07/844,743 filed Mar. 2, 1992, now abandoned.

BACKGROUND OF THE INVENTION

This invention relates to an improved process for the preparation of a blend or alloy of a nitrile thermoelastic polymer and a polyamide thermoplastic polymer with a plated mineral filler and the alloy produced thereby.

It has been common place for many years to blend polymers together in an effort to improve their physical properties. Problems have been encountered in the formation of blends of plastics and elastomers because plastics are, in many instances, incompatible with elastomers. That incompatibility has been frequently explained on the basis of the relative polarity of the polymer molecules. As a general rule, polar elastomers are incompatible with non-polar plastics and compatible with polar plastics, while non-polar elastomers are incompatible with polar plastics and compatible with non-polar plastics.

It has been proposed to combine nitrile rubbers with a variety of plastics in an effort to provide a blend having the chemical resistance and abrasion resistance typical of nitrile rubbers. Because both nitrile elastomers and polyamides are both polar polymers and hence are compatible, attempts have been made to form blends thereof. A number of problems, however, have been encountered in preparing such blends. In general, the melting point of the thermoplastic polyamide component of the blend must be reached to obtain a blend which is truly homogenous and miscible. When, however, the thermoelastic nitrile polymer to be used in the blend is heated to the melting point of polyamides, the nitrile rubber degrades quite rapidly. In addition, when the thermoplastic polyamide reaches its melting point a high viscosity reduction is observed, and it consequently exhibits a liquid-like behavior. That lack of resistance to flow when the polyamide has been heated to temperatures at its melting point and above limits the efficiency with which energy can be imparted to the mixture to provide the desired homogeneity. In other words, once heated to its melting point, the polyamide behaves like a liquid, exhibiting no resistance to flow, and consequently cannot be uniformly admixed with the nitrile rubber. In addition to those problems, such blends have a marked tendency to adhere to metal when at an elevated temperature, and that limits the ability to maintain a uniform blend during processing in conventional polymer mixing equipment.

It has been proposed, as described by Tostuklina and Kolesnikova in a paper entitled "Properties of Vulcanizates Based On Combinations Of Butadiene-Acrylonitrile Rubber And Polyamide" in *Revue Generale des Caoutchoues et Plastiques*, Vol. 48, p. 1238 (1979), to blend NBR and polyamide which are either filled with carbon black or unfilled. The process there described is a two step process, although the second step is not clearly disclosed.

British Patent No. 866,479 processes blends of NBR and polyamide reinforced with carbon black prepared by a two-roll mill in which the NBR and carbon black are first mixed at about 50° C. and then the polyamide is blended at a temperature above its melting point. Finally, the blend is cooled to about 80° C. to permit mixing of the vulcanization reagents. Similarly, British Patent No. 1,190,049 described homogenous blends of polyamide with metal salts of carboxylic acids and polydiene polymers to produce thermoplastic molding materials. That British patent employs specifically temperatures below the melting point of the polyamide.

U.S. Pat. No. 3,218,371 describes extruder blending of nitrile rubber, styrene-acrylonitrile thermoplastic copolymers and a polyamide to produce blends having no elastomeric properties.

EPO published Application No. 264859A1 describes vulcanizable rubbery compositions of NBR, hydrogenated NBR and polyamide, while U.S. Pat. No. 4,356,286 describes the preparation of blends employing specifically a combination of a high melting point polyamide and a low melting point polyamide with NBR.

None of the prior art describes a process for providing blends or alloys of NBR and a polyamide which is truly homogenous without degradation of the NBR to provide a stable alloy having enhanced resistance to organic solvents such as gasoline and gasohol, excellent abrasion resistance and improved ozone resistance.

It is accordingly an object of the present invention to provide a process for the preparation of an alloy, a homogenous blend of a nitrile rubber and a polyamide thermoplastic in which neither polymeric component is degraded during the blending process.

It is another object of the invention to provide a process for the preparation of homogenous blends of a nitrile rubber and a polyamide under conditions such that sufficient energy can be imparted to the blend at high temperatures to produce an alloy which can be processed to form pellets which are free flowing for easier handling and shipping.

SUMMARY OF THE INVENTION

The concepts of the present invention reside in a composition and process for the preparation of an NBR alloy of a nitrile thermoelastic polymer and a thermoplastic polyamide in which the polyamide, the nitrile thermoelastic polymer and a plated mineral filler are mixed together and heated to a temperature at or above the melting temperature of the polyamide during mixing to produce a homogenous blend. It is believed, without limiting the invention as to theory, that the plated mineral filler serves to increase the viscosity during mixing of the melted polyamide component to ensure that sufficient energy is imparted to the blend during mixing such that the resulting blend is formed into an NBR alloy in which the nitrile rubber and the polyamide are completely dissolved in each other. The plated mineral filler also serves to reduce adhesion between the blend and the metal surface of the mixer and, therefore, reduces the tendency of the blend to scorch and stick and thus avoids other mixing contamination problems.

The NBR alloys produced in accordance with the concepts of the present invention have improved physical properties including a resistance to fuels and oils, abrasion resistance and improved low-temperature properties.

DETAILED DESCRIPTION OF THE INVENTION

In accordance with the practice of the invention, a plated mineral filler, a polyamide, a nitrile rubber and a stabilizer are mixed at a temperature at or above the melting temperature of the polyamide under conditions to form a homogenous soluble blend or NBR alloy. To maintain the homogenous blend as an alloy it is preferred to cool and then rapidly quench the extrudate or blend as it is let down from the mixing equipment. NBR Alloy as used herein refers not only to a homogenous blend, but to the fact that the two polymeric phases will not separate into discrete domains on cooling and will remain as one phase when observed under scanning electron microscopy. The NBR alloy also shows a single unique glass transition temperature.

Mineral fillers, particularly silicas and silicates are known to alter the rheological properties of liquids resulting in more viscous mixtures or gels. It is believed, but without limiting the practice of the invention, that the plated mineral filler serves to increase the viscosity of the polyamide while it is maintained above its melting temperature so that its viscosity is more similar to that of the thermoelastic rubber. This ensures that sufficient energy is imparted to the blend so that mixing necessary to produce a homogenous blend or alloy occurs.

It is postulated that the plated mineral fillers also serve to dissipate heat at a high rate since degradation of the nitrile polymer at the high temperatures of the mixing process did not occur.

In addition, the plated mineral filler also serves to reduce the adhesion of the hot blend to metal of the mixing apparatus so that the batch can be discharged, sheeted and formed into free flowing pellet or pelletized via conventional extruder know-how.

As will be appreciated by those skilled in the art, the plated mineral filler may also serve as a semi-reinforcing filler in the final blend, thus imparting further strength to the blend.

As the plated mineral filler employed in the practice of the invention, use can be made of fine particulate mineral fillers such as certain talcs, well known to those skilled in the art. Such fillers typically have mean particle diameters ranging from 0.1 to 10 microns and have surface areas per unit of weight in the range from 10 to 50 square meters per gram. Such mineral fillers may be silicates, hydrated silicates, carbonates, or clays. Particularly good results have been achieved with the use of Magnesium silicates sold by Cyprus Industrial Minerals such as Mistron Vapor and Mistron Cyprusbond. Such mineral fillers are themselves well known to those skilled in the art.

Blended with the mineral fillers is a polyamide or Nylon. A wide variety of suitable polyamides may be used in the practice of the invention. As a general rule, it is usually preferred to employ polyamides having melting points at or below 440° F. The use of such lower melting polyamides thus serves to minimize the likelihood of thermodegradation of the nitrile thermoelastic polymer. Illustrative of the polyamides employed in the practice of the invention are those high molecular weight solid polymers including copolymers and terpolymers having recurring amide units within the polymer chain prepared by polymerization of one or more epsilon-lactams or amino acids or by condensation of one or more aliphatic dibasic acids with one or more aliphatic diamines. Examples of polyamides with melting points at or below 440° F. can be found in Kirk-Othmer "Encyclopedia of Polymer Science & Technology", Volume 10, pages 392–414. Representative polyamides include Poly (11-aminoundecanoic acid), Polycapryllactam, Polylauryllactam, Polycaprolactam, Polyhexamethylazelamide, Polyhexamethylenesebacamide, and the condensation product of hexamethylenediamine and dodecanedioic acid.

As the nitrile rubber, use can be made of any of a number of essentially random noncrystalline copolymers based on acrylonitrile. Preferred are those NBR rubbers prepared by copolymerization of acrylonitrile with butadiene, although use can be made of other NBR rubbers prepared by copolymerization of acrylonitrile with conjugated dienes including isoprene, chloroprene, 2, 3-dimethylbutadiene, etc. In general, such nitrile rubbers contain 18 to 55% by weight of acrylonitrile and 82 to 45% by weight of a conjugated diene. The nitrile rubber can have additional monomers as part of the basic copolymer system, such as α,β-unsaturated carboxylic acids and their esters, alkyl substituted benzenes, and the like. Illustrative of such monomers are acrylic acid, methacrylic acid, fumaric acid, itaconic acid, methyl methacrylate, and the like. Additional useful nitrile rubbers are disclosed in U.S. Pat. Nos. 4,197,379; 4,508,867; and 4,619,962.

The nitrile rubber can be substituted in part by a fully or partially hydrogenated nitrile rubber when greater thermal stability is required for end use. The fully or partially hydrogenated nitrile rubber is prepared by selective catalytic hydrogenation in solution of the carbon-carbon double bonds, selectively, of the nitrile rubber. Catalyst for selective hydrogenation of solid nitrile rubbers are explained in U.S. Pat. Nos. 4,503,196 and 4,581,417.

The molecular weight of the nitrile rubber will depend on the use of the NBR alloy. Nitrile rubbers having molecular weight measured as a Mooney viscosity of 20–130 ML1+4 @ 100° C. are useful in the practice of the present invention.

It is also important in the practice of the present invention to include during the elevated temperature mixing of the nitrile rubber with the polyamide a stabilizer to protect the blend against thermal and/or oxidative degradation, particularly degradation of the nitrile rubber. Such stabilizers or antioxidants also serve to improve the aging properties of the pelletized alloy during storage and of articles formed from the vulcanized alloys of the invention. In general, use can be made of a wide variety of antioxidants which serve to improve the resistance of both nitrile rubbers and polyamides to degradation by oxygen or at high temperatures. Stabilizers useful in the practice of this invention can be selected from the group consisting of Group I metal halides, cupric halides, hindered phenols, organophosphites, hydroquinone, and paraphenylenediamines. Representative of suitable antioxidants include Irganox® 1098, 1330 and 565.

In some instances, it may be desirable to include, as an optional component, a plasticizer which serves to reduce the viscosity of the blend during extrusion. Additional plasticizer may be added when vulcanizates are prepared from the NBR alloys of the present inventions to improve the low temperature flexibility as is well known to those skilled in the trade. A wide variety of suitable plasticizers can be employed in the practice of the invention. The plasticizer must be compatible with both the polyamide and the nitrile rubber and therefore must be a polar type derivative. Suitable polar type derivatives are selected from the group consisting of etherthioethers, dialkyldiether glutarates, diakly phthalates, sulfonamides, mixed alkyl adipates, mixed alkyl alkoxy phosphates. Specific examples include dioctyl phthalate, tributoxyethylphosphate, dibutyl sebacate, mixed $C_7$–$C_9$ dialkyl adipate, ether thioether such as Vulcanol® OT and a dialkyldiether glutarate such as Plasthall® 7050.

In the preferred practice of the invention, the plated mineral filler and the polyamide are introduced sequentially to a suitable mixing apparatus at low RPM, followed by the addition of the stabilizer and the nitrile rubber. Addition of the plasticizer can be held back to allow the mixer to generate heat. Mixing can be carried out in a variety of suitable mixing apparatus including, for example, a Banbury Mixer for batch mixing of the blends or by, for example, a extruder for continuous extrusion mixing of the blend. Such mixing equipment is well known to those skilled in the art and forms no part of the present invention.

In the use of the Banbury Mixer, the four ingredients are added sequentially to the mixer operating at a low agitation speed. After the mixer is closed, the rate of agitation is increased and heat is supplied to the blend to increase its temperature to the melting point of the polyamide. That temperature is maintained for a relatively brief period of time, typically about a minute or less, after which the blend is cooled to approximately 270° F. by a reduction in the rate of agitation of the Banbury Mixer and by introduction of cold water to the Banbury jacket. After the NBR alloy is dropped from the Banbury Mixer, it is preferably, immediately quenched in cold water, dried and sheeted into pellets.

Alternatively, in extrusion mixing by way of a continuous operation, the components are metered to a mixing extruder where they are brought to the melting temperature of the polyamide, preferably in the mixing zone of the extruder. Where use is made of a plasticizer during extrusion mixing, it is generally preferred that the plasticizer be added to the barrel after the mixing zone. After a homogeneous blend is obtained, the NBR alloy can then be pumped into subsequent zones of the extruder maintained at lower temperatures to thereby cool the NBR alloy to a temperature below the polyamide melting temperature. The extrudate is preferably quenched in cold water prior to pelletization in accordance with conventional techniques. In a most preferred practice of the invention as the extrudate exists from the extruder it is contacted with chilled water at approximately 40° F. for at least one minute to effect quenching, then cut into pellets.

In either type of operation, it is generally sufficient that the blend, as it is formed during agitation, be maintained at a temperature at least equal to the melting temperature of the polyamide. Higher temperatures can be used, although such higher temperatures are frequently accompanied by a higher rate of polymer degradation. Thus, the temperature limitations during formulation of the blend are bounded at their lower end by the melting temperature of the polyamide and, at their upper end, by a temperature to minimize nitrile rubber degradation during agitation.

As previously indicated, the use of the plated mineral fillers serve to increase viscosity of the melted polyamide in addition to dissipate heat supplied to the blend. As will be appreciated by those skilled in the art, the temperature limitations employed during formation of the blend are in part dependant on the amount of mineral fillers employed, a greater amount of filler allowing for higher temperatures if desired. In general, the amount of the mineral filler employed is ratioed to the amount of polyamide in the blend and is preferably in the range 2:1 to 1:2 filler to polyamide.

The relative proportions of the nitrile rubber and the polyamide can be varied within relatively wide ranges, depending in part on the intended application of the vulcanized rubber article. In general, use can be made of NBR alloys in which the ratio of nitrile rubber to polyamide varies ranging from 3:1 to 1:1.

The NBR alloys of the present invention can be admixed with conventional rubber additives and processed in accordance with conventional thermoelastic processing techniques. These alloys can be formulated according to conventional vulcanization recipes and cured in accordance with standard curing techniques for NBR rubbers including steam curing.

The NBR alloys of the present invention are considered alloys of the nitrile rubber and polyamide components since the polymers are miscible with each other and the NBR alloy shows a single unique glass transition temperature. Thus, in the NBR alloys of the present invention, the nitrile rubber and the polyamide are dissolved in each other to form a homogenous miscible blend. The NBR alloys of the invention have been found to exhibit low permeability, improved fuel and oil resistance, low temperature property retention and improved abrasion resistance and aging properties.

Having described the basic concepts of the invention, reference is now made to the following examples, which are provided by way of illustration and not byway of limitation of the practice of the invention.

The following chemical ingredients or components were used in preparation of the Examples.

| Component | Properties |
| --- | --- |
| NYsyn ® 406P | Nitrile rubber having 40 weight % bound acrylonitrile and a Mooney viscosity (ML 1 + 4 @ 100° C.) of 70 (Copolymer) |
| NYsyn ® 33-5 HM | Nitrile rubber having 33 weight % bound acrylonitrile and a Mooney viscosity (ML 1 + 4 @ 100° C.) of 50 (Copolymer) |
| NYsyn ® MDN-131 | Nitrile rubber having 50 weight % bound acrylonitrile and a Mooney viscosity (ML 1 + 4 @ 100° C.) of 50 (Copolymer). |
| BMFO | Nylon-11, poly (11-aminoundecanoiacid) melting point 188° C. (370° F.) (ATOCHEM Inc.). |
| Mistron Vapor ® | Filler; Magnesium Silicate; $3MgO\ 4SiO_2\ H_2O$, surface area 20 $m^2/gm$, maximum particle size 6 microns, (Cyprus Industrial Minerals Company). |
| Mistron Cyprubond ® | Filler, coated; Magnesium Silicate coated with proprietary organosilicon; surface area 20 $m^2/gm$; maximum particle size 6 micron (Cyprus Industrial Minerals Company). |
| Plasthall ® 7050 | Plasticzer softener; Dialkyl Diether Gluctarate; (C. P. Hall). |
| Vulkanol ® OT | Plasticizer, Etherthioether (Mobay Corporation). |
| Irganox ® 1098 | Antioxidant, N,N'-Hexamethylene Bis(3,5-Di-tert-butyl-4-hydroxyhydro cinnonamide); m.p. 156–161° C. (302°–320° F.) (Ciba-Geigy Corporation). |
| Luperco 130XL | Vulcanizer, 2,5-Dimethyl-2,5-di(t-butyl peroxy) hexyne-3 (Harwick). |
| Sulfason ® R | Vulcanizer, Dimorpholinodisulfide (Monsanto). |
| Pennac ® TM | Accelerator, Blend of Tetrmaethyl thiuram disulfide and Tetra ethyl thiuram disulfide (Struk-Chem). |
| Morfax ® | Accelerator, 4-Morpholinyl-2-benzothiazole, (R. T. Vanderbilt). |

EXAMPLE 1

This example illustrates the preparation of an NBR alloy embodying the concepts of the invention.

There is supplied to a conventional Banbury Mixer the following components:

| Component | Parts By Weight |
| --- | --- |
| Magnesium Silicate (Mistron Vapor) | 30 |
| Polyamide (Nylon 11) | 30 |
| Antioxidant (Irganox 1098 | 0.5 |

-continued

| Component | Parts By Weight |
|---|---|
| Nitrile Rubber (NYsyn 33-5HM) | 70 |
| Plasticizer (Vulkanol OT) | 10 |

The nitrile rubber in this example is a commercially available copolymer of acrylonitrile and butadiene and contains 33% by weight acrylonitrile. After the components are introduced to the Banbury Mixer, the rate of agitation is increased and steam is supplied to the heat jacket of the mixer to increase the temperature of the blend to about 400° to 410° F. for approximately one minute. Thereafter, the NBR alloy batch is cooled to about 270° F. by reducing the rate of agitation and introducing cold water to the Banbury jacket.

The NBR alloy is dropped from the Banbury Mixer, quenched in cold water, dried and formed into pellets. The NBR alloy then can be compounded in a conventional manner and extruded or molded in accordance with conventional processing techniques.

EXAMPLE 2

This example illustrates the improved properties of the cured NBR alloy. Three NBR alloys prepared according to Example 1 are compounded with the following formulations:

| Component | Parts By Weight Example A | Parts By Weight Example B | Parts By Weight Example C |
|---|---|---|---|
| NBR alloy From Example 1 | 140.5 | 140.5 | 140.5 |
| Carbon Black (N-660) | 5 | 30 | 30 |
| Plasticizer (Vulkanol OT) | 5 | 5 | 5 |
| Zinc Oxide | 5 | 5 | 5 |
| Lubricant (Stearic Acid) | 0.5 | 0.5 | 0.5 |
| Vulcanizer (Luperco 130XL) | 5 | 3 | 5 |

The foregoing compound is cured, and the cured blends are tested for tensile strength, elongation, modulus, resistance to fuel and oils, low temperature properties, permeability to freon 12 and for brittle point.

The results of these tests are shown on the following table:

TABLE I

| FORMULATION | A | B | C |
|---|---|---|---|
| Tensile, MPA | 13.3 | 19.2 | 19.4 |
| Elongation, % | 222 | 275 | 172 |
| 100% Modulus, MPa | 7.5 | 9.2 | 13.7 |
| 200% Modulus, MPa | 12.2 | 15.2 | — |
| Hardness, Shore A | 72 | 75 | 78 |
| AFTER IMMERSION IN #3 OIL 70 Hrs @ 100° C. | | | |
| Tensile, % change | 39.97 | 18.94 | 28.91 |
| Elongation % change | −9.01 | −24 | −25.6 |
| Hardness, Pts. change | 1 | 2 | 1 |
| Volume Change, % | −0.85 | 0.26 | −0.3 |
| AFTER IMMERSION IN FUEL C/METHANOL 85/15 70 Hrs @ RT | | | |
| Tensile, % change | −21 | −18.5 | −22.8 |
| Elongation, % change | −51.4 | −54.9 | −51.2 |
| Hardness, Pts. change | 0 | −1 | 2 |
| Volume Change, % | 45.8 | 44.4 | 37.8 |
| AFTER IMMERSION IN FUEL C 70 Hrs @ RT | | | |
| Tensile, % change | −9.77 | −19.9 | −12.6 |
| Elongation, % change | −33.8 | −39.6 | −31.4 |
| Hardness, Pts. change | 1 | −1 | 5 |
| Volume Change, % | 27.2 | 27.6 | 23.6 |
| Low Temp Retraction (°C.) | −36 | −37 | −34 |
| Freon 12 Permeability lb/ft/yr | 4.3 | 4.6 | 3.2 |
| Brittle Point (°F.) | P@−70 | P@−70 | P@−70 |

EXAMPLE 3

This example illustrates the practice of the present invention in which a nitrile rubber containing 50 wt % bound acrylonitrile is blended with Nylon 11 to form an NBR alloy.

There is supplied to a Banbury Mixer the following components:

| Component | Parts By Weight |
|---|---|
| Magnesium Silicate (Mistron Vapor) | 15 |
| Polyamide (Nylon 11) | 30 |
| Antioxidant (Irganox 1098) | 0.5 |
| Nitrile Rubber (NYsyn MDN131) | 70 |
| Plasticizer (Plasthall 7050) | 5 |

After the components are introduced to the Banbury Mixer, the rate of agitation is increased and steam is supplied to the heat jacket of the mixer to increase the temperature of the blend to about 400° to 410° F. for approximately one minute. Thereafter, the NBR alloy is cooled to about 270° F. by reducing the rate of agitation and introducing cold water to the Banbury jacket.

The NBR alloy is dropped from the Banbury Mixer, immediately quenched in cold water, dried and formed into pellets. The NBR alloy of the invention is then formulated in a conventional compounding recipe as seen below and cured to form a test article.

| Component | Parts By Weight |
|---|---|
| NBR alloy of this example | 120.5 |
| Filler (Mistron Cyprubond) | 15 |
| Carbon Black N-660 | 30 |
| Plasticizer (Plasthall 7050) | 15 |
| Zinc Oxide | 5 |
| Stearic Acid | 1 |

-continued

| Component | Parts By Weight |
|---|---|
| Vulcanizing Agent (Sulfasan R) | 1.5 |
| Pennac TM | 2 |
| Morfax | 1 |

The cured blend as prepared above is tested and found to have the following properties:

TABLE II

| CMPD ML 1 + 4 (212° f.) | 42.8 |
|---|---|
| Mooney Scorch (270° F.) | |
| Min. to 5 Pt. Rise | 13.1 |
| Minimum Reading | 15.5 |
| Tensile, MPa | 16.06 |
| Elongation, % | 162 |
| 100% Modulus, MPa | 11.8 |
| Hardness, Shore A | 85 |
| Compression Set, % 70 Hrs. @ 125° C. | 53.9 |
| Low Temp Retraction (°C.) TR-O | −23.2 |
| Low Temp Brittle Point (°F.) | F@−48 |
| Fuel C Permeation Rate g/m²/day | 4.8 |
| After Immersion in Fuel C 70 Hrs @ RT | |
| Tensile, % change | −2.7 |
| Elongation, % change | −26.5 |
| Hardness, Pts. change | −10 |
| Volume Change, % | 12 |
| After Immersion in Fuel C/Methanol 85/15 70 Hrs @ RT | |
| Tensile, % change | −9.1 |
| Elongation, % change | −24.1 |
| Hardness, Pts. change | −15 |
| Volume Change, % | 18.9 |

The foregoing data show that the alloys of the present invention exhibit excellent resistance to fuels and oils, not otherwise obtainable with composition of the prior art. The permeability with respect to Freon and Fuel C show that non-ridged hoses can be made from blends of the present invention which exhibit low permeability values. Such hoses find particular application in the automotive field since flexible hoses made from the blends of the present invention do not transmit noise or vibrations from an automobile engine to the body of an automobile as rigid hoses of the prior art do.

EXAMPLE 4

This example illustrates the effect of rapid quenching on the mechanical properties of the vulcanized NBR alloy. The NBR alloy is prepared in a lab size banbury by adding to the banbury under slow RPM (77 RPM) the ingredients in the following order; first the Nylon BMFO, next the Mistron Vapor, next the Irganox 1098, next the nitrile rubber and last the plasticizer according to the following four formulations.

| Component | A-1 | A-2 | B-1 | B-2 |
|---|---|---|---|---|
| | Parts By Weight | | | |
| Nylon BMFO | 30 | 30 | 30 | 30 |
| Mistron Vapor | 30 | 30 | 30 | 30 |
| Irganox 1098 | 0.5 | 0.5 | 0.5 | 0.5 |

-continued

| Component | A-1 | A-2 | B-1 | B-2 |
|---|---|---|---|---|
| | Parts By Weight | | | |
| Nysyn 406P | 70 | | 70 | |
| Nysyn MDN131 | | 70 | | 70 |
| Plasthall 7050 | 5 | 5 | 5 | 5 |

The banbury is closed when all the ingredients are added and then bump once or twice to make sure all the ingredients are in the banbury. The NBR alloy is then formed by increasing the temperature of the ingredients under intense mixing and applying steam to the banbury jacket. The banbury RPM is increased 230 during this stage. These conditions are maintained until the melting temperature of the polyamide is reach and kept at this temperature for a period of ½ to 1 minute. For polyamide, Nylon 11, a temperature of 400° F. is maintained to obtain a good mixture (at or above the melting point of the polyamide). Then the NBR alloy is cooled by reducing the banbury RPM to 77 RPM and circulating cold water in the banbury jacket. When the NBR alloy temperature reaches 270° F. it is dropped from the banbury and quenching studies are done by breaking the alloy batch in two batches, A and B. Batch A, receives no quench, it is taken directly to a cold mill and cooled and sheeted on the mill. Batch B is immediately quench by submerging the NBR alloy in 40° F. water for ½ minute, followed by milling into a sheet and drying in air.

Each NBR alloy batch is then tested for physical properties by compounding and curing according to the formulation below.

| | A-1 | A-2 | B-1 | B-2 |
|---|---|---|---|---|
| | Parts By Weight | | | |
| Formulation # | C | D | E | F |
| Ingredients | | | | |
| A-1 | 135.5 | | | |
| A-2 | | 135.5 | | |
| B-1 | | | 13.5 | |
| B-2 | | | | 135.5 |
| N-660 Black | 30 | 30 | 30 | 30 |
| Plasthall 7050 | 20 | 20 | 20 | 20 |
| Zinc Oxide | 5 | 5 | 5 | 5 |
| Stearic Acid | 1 | 1 | 1 | 1 |
| Sulfasan R | 1.5 | 1.5 | 1.5 | 1.5 |
| Pennac TM | 2 | 2 | 2 | 2 |
| Morfax | 1 | 1 | 1 | 1 |
| Quench | NO | NO | YES | YES |

The results of mechanical property tests are shown on the following Table III.

TABLE III

| Test Conditions | Press Cure @ 350° F. | Formulations # | | | |
|---|---|---|---|---|---|
| | | C | D | E | F |
| Mooney Scorch (270° F.) | | | | | |
| Min. to 5 Pt. Rise | | 9.4 | 12 | 9.7 | 12.3 |
| Minimum Reading | | 24 | 19 | 26 | 24 |
| Rheograph Properties 350° F., 30 Min. Motor | | | | | |
| Min. Torque, in-lbs | | 9.0 | 5.0 | 9.9 | 5.2 |
| Max. Torque, in-lbs | | 92.4 | 65.2 | 98.5 | 69.5 |

TABLE III-continued

| Test Conditions | Press Cure @ 350° F. | Formulations # C | D | E | F |
|---|---|---|---|---|---|
| T2, minutes | | 1.3 | 1.6 | 1.4 | 1.6 |
| T90, minutes | | 3.5 | 3.2 | 3.7 | 3.2 |
| Delta Torque in-lbs | | 83.4 | 60.2 | 88.6 | 64 |
| Tensile, psi | 20' | 2330 | 1933 | 2264 | 2000 |
| | 30' | 2275 | 2145 | 2414 | 1852 |
| Elongation, % | | 235 | 140 | 214 | 201 |
| | | 198 | 190 | 227 | 175 |
| 100% Modulus, psi | | 1425 | 1631 | 1443 | 1443 |
| | | 1602 | 1562 | 1511 | 1420 |
| 200% Modulus, psi | | 2166 | | 2188 | 1995 |
| | | | | 2274 | |
| Hardness, Shore A | | 80 | 81 | 80 | 80 |
| | | 80 | 82 | 80 | 80 |
| NBS Abrasion Index | | 147 | 108 | 170 | 120 |

The vulcanizates from quenched NBR alloys demonstrate a higher viscosity as shown by the Mooney Scorch values. During curing the quenched NBR alloys demonstrate a higher viscosity and delta torque value and therefore develop a higher degree of crosslinked density. Also notably, higher abrasion values are measured for vulcanizates of the quenched NBR alloys as shown by improvement in Abrasion Index Test.

It will be understood that various changes and modifications can be made in the details of the formation, procedure and use without departing from the spirit of the invention, especially as defined in the following claims.

I claim:

1. A process for the preparation of an NBR alloy of a thermoelastic polymer and a thermoplastic polymer comprising the steps of:
   (a) blending together a plated mineral filler, a polyamide thermoplastic polymer, an antioxidant and a nitrile thermoelastic polymer wherein the weight ratio of the nitrile thermoelastic polymer to the polyamide thermoplastic polymer is within the range of 3:1 to 1:1;
   (b) heating the blend while mixing to a temperature ranging from the melting temperature of the polyamide to a temperature sufficient to minimize degradation of the nitrile thermoelastic polymer to dissolve the polyamide thermoplastic polymer and the nitrile thermoelastic polymer in each other and produce a homogeneous miscible blend having a single glass transition temperature; and
   (c) cooling the homogeneous miscible blend.

2. A process as defined in claim 1 wherein the polyamide thermoplastic polymer has a melting point at or below 440° F.

3. A process as defined in claim 1 wherein the polyamide thermoplastic polymer is a solid polymer having recurring amide units within the polymer chain prepared by polymerization of one or more epsilon lactams or amino acids or by condensation of one or more aliphatic dibasic acids with one or more aliphatic diamines.

4. A process as defined in claim 1 wherein the nitrile thermoelastic polymer is an NBR rubber prepared by the copolymerization of acrylonitrile with butadiene.

5. A process as defined in claim 1 wherein the NBR rubber is a rubber prepared by copolymerization of acrylonitrile with a conjugated diene.

6. A process as defined in claim 5 wherein the nitrile rubber also contains at least one further vinyl monomer.

7. A process as defined in claim 6 wherein said further monomer is selected from the group consisting of acrylic acid, methacrylic acid, fumaric acid, itaconic acid and methylmethacrylate.

8. A process as defined in claim 1 wherein the nitrile polymer includes a hydrogenated nitrile rubber.

9. A process as defined in claim 1 wherein the nitrile thermoelastic polymer has a Mooney viscosity of 20 to 130 ML1+4 at 100° C.

10. A process as defined in claim 1 wherein the plated mineral filler has a mean particle diameter ranging from 0.1 to 10 microns and a surface area within the range of 10–50 m2/g.

11. A process as defined in claim 1 wherein the plated mineral filler is selected from the group consisting of silicates, hydrated silicates, carbonates or clays.

12. A process as defined in claim 1 which includes the step of quenching the blend.

13. A process as defined in claim 1 wherein the antioxidant is a stabilizer to improve the resistance of the polyamide thermoplastic polymer and the nitrile thermoelastic polymer to degradation by oxygen or high temperatures.

14. A process as defined in claim 13 wherein the antioxidant is, selected from the group consisting of Group I metal halides, cupric halides, hindered phenols, organo phosphites, hydroquinones, and paraphenylene diamines.

15. A process as defined in claim 1 which includes blending the plate mineral filler, the polyamide thermoplastic polymer and the nitrile thermoelastic polymer in the presence of a plasticizer compatible with both the polyamide polymer and the nitrile polymer.

16. A process as defined in claim 15 wherein the plasticizer is a polar plasticizer.

17. A process as defined in claim 1 wherein the plasticizer is selected from the group consisting of etherthioethers, dialkyl diether glutarates, dialkyl phthalates, sulfonamides, mixed alkyl adipates and mixed alkyl alkoxyphosphates.

18. A process as defined in claim 1 wherein the weight ratio of the plated mineral filler to the polyamide thermoplastic polymer is within the range of 2:1 to 1:2.

19. An alloy of a thermoplastic polymer and a thermoelastic polymer comprising a plated mineral filler, a polyamide thermoplastic polymer, an antioxidant and a nitrile thermoelastic polymer wherein the weight ratio of the nitrile thermoelastic polymer to the polyamide thermoplastic polymer is within the range of 3:1 to 1:1, said alloy having a single glass transition temperature and the polyamide thermoplastic polymer and nitrile thermoelastic polymer being dissolved in each other to form a homogeneous miscible blend.

20. An alloy as defined in claim 19 wherein the polyamide thermoplastic polymer has a melting point at or below 440° F.

21. An alloy as defined in claim 19 wherein the polyamide thermoplastic polymer is a solid polymer having recurring amide units within the polymer chain prepared by polymerization of one or more epsilon lactams or amino acids or by condensation of one or more aliphatic dibasic acids with one or more aliphatic diamines.

22. An alloy as defined in claim 19 wherein the nitrile thermoelastic polymer is an NBR rubber prepared by the copolymerization of acrylonitrile with butadiene.

23. An alloy as defined in claim 19 wherein the NBR rubber is a rubber prepared by copolymerization of acrylonitrile with a conjugated diene.

24. An alloy as defined in claim 19 wherein the nitrile polymer includes a hydrogenated nitrile rubber.

25. An alloy as defined in claim 19 wherein the nitrile thermoelastic polymer has a Mooney viscosity of 20 to 130 ML1+4 at 100° C.

26. An alloy as defined in claim 19 wherein the plated mineral filler has a mean particle diameter ranging from 0.1 to 10 microns and a surface area within the range of 10–50 m2/g.

27. An alloy as defined in claim 19 wherein the plated mineral filler is selected from the group consisting of silicates, hydrated silicates, carbonates or clays.

28. An alloy as defined in claim 19 which includes an antioxidant as a stabilizer to improve the resistance of the polyamide thermoplastic polymer and the nitrile thermoelastic polymer to degradation by oxygen or high temperatures.

29. An alloy as defined in claim 28 wherein the antioxidant is selected from the group consisting of Group I metal halides, cupric halides, hindered phenols, organo phosphites, hydroquinones, and paraphenylene diamines.

30. An alloy as defined in claim 19 which includes a polar plasticizer.

31. An alloy as defined in claim 30 wherein the plasticizer is selected from the group consisting of etherthioethers, dialkyl diether glutarates, dialkyl phthalates, sulfonamides, mixed alkyl adipates and mixed alkyl alkoxy phosphates.

32. An alloy as defined in claim 19 wherein the weight ratio of the plated mineral filler to the polyamide thermoplastic polymer is within the range of 2:1 to 1:2.

* * * * *